United States Patent
Le Blanc et al.

[11] 3,875,428
[45] Apr. 1, 1975

[54] ARRANGEMENT FOR SELECTIVELY DETERMINING RATE OF INTEGRATION OF AN APPLIED OSCILLATORY SIGNAL BY SELECTING THE PROPORTION OF EACH SIGNAL CYCLE DURING WHICH INTEGRATION TAKES PLACE

[75] Inventors: Richard E. Le Blanc, Orange; Bernard F. Delettrez, Whittier, both of Calif.

[73] Assignee: Beckman Instruments Inc., Fullerton, Calif.

[22] Filed: Dec. 10, 1973

[21] Appl. No.: 423,074

[52] U.S. Cl. ............... 307/229, 307/240, 307/251, 307/304, 328/127
[51] Int. Cl. ............ G06g 7/12, H03k 17/00
[58] Field of Search .......... 307/229, 230, 240, 251, 307/304; 328/127

[56] References Cited
UNITED STATES PATENTS

| | | | |
|---|---|---|---|
| 3,495,097 | 2/1970 | Abramson et al. | 307/240 |
| 3,549,903 | 12/1970 | Lowdenslager | 307/229 |
| 3,564,394 | 2/1971 | Opal et al. | 307/297 |
| 3,586,989 | 6/1971 | Wheable | 307/241 |
| 3,588,531 | 6/1971 | Bjor | 328/127 |
| 3,603,814 | 9/1971 | Ohashi | 307/240 |
| 3,610,953 | 10/1971 | Gordon et al. | 307/230 |
| 3,691,470 | 9/1972 | Naylor | 307/240 |
| 3,701,059 | 10/1972 | Nyswander | 307/304 |

*Primary Examiner*—Stanley D. Miller, Jr.
*Attorney, Agent, or Firm*—R. J. Steinmeyer; P. R. Harder

[57] ABSTRACT

An integrator for an electrical signal is provided with means for changing integrating rates without attenuating the input signal or utilizing a potentiometer to give different degrees of attenuation for this purpose. Instead of attenuating the input signal with varying degrees of attenuation, means are provided to control the proportion of time that the full input signal is applied to the integrator. Adjustable, pulse-length controlled electronic switches are employed for alternately changing the gain of the integrator, in order to control the length of time that the signal is applied to the integrator.

2 Claims, 8 Drawing Figures

ARRANGEMENT FOR SELECTIVELY DETERMINING RATE OF INTEGRATION OF AN APPLIED OSCILLATORY SIGNAL BY SELECTING THE PROPORTION OF EACH SIGNAL CYCLE DURING WHICH INTEGRATION TAKES PLACE

BACKGROUND OF THE INVENTION

In various types of analyzers and other instruments the area under a curve is determined by integration to provide the value of a desired measurement. Under varying conditions a different rate of integration may be desired.

In gas chromatography, for example, a sample passed through a column system will separate into its individual components and are separately detected by a recording instrument which produces a curve varying with the output of a detector, which is responsive to the instantaneous concentration of a given constituent so that a series of peaking curves is produced. The area under a peak is a measure of relative concentration of the component or constituent of the sample. This area can be measured by means of an integrator receiving a signal from the detector to give an output which is proportional to the area. Different components give different responses from the detector and the signal to the integrator has to be controlled to prevent it from saturating. Thus it is desirable to change the rate of integration.

Different rates of integration in integrating circuits have been obtained by utilizing a potentiometer to attenuate the input signal and connecting different points on the potentiometer to an integrator or utilizing different attenuators with different degress of attenuation for different integration rates. The efficacy of this method depends upon keeping the input signal to the input resistor of the integrator low so that integration rate can be controlled. Consequently, the input resistor to the unit must have a high value. This also necessitates the use of more expensive resistors and resistors which are more sensitive to fluctuations in temperature.

It is accordingly an object of the invention to avoid the necessity for attenuating the input signal to permit varying integration rate.

Other and further objects, features and advantages of the invention will become apparent as the description proceeds.

SUMMARY OF THE INVENTION

In carrying out the invention in accordance with a preferred form thereof, an operational amplifier with capacitative feedback is employed as an integrator. A chopping circuit is interposed in advance of the integrator. The input signal is connected to the input terminal of the integrator through a resistor or a pair of resistors in series having an electronic switch interposed between the series resistors and the input terminal of the amplifier and, if desired, having a shunting or grounding switch connected to the junction terminal of the series resistors with means for closing one switch while the other is open. There is a monostable multivibrator control circuit producing a variable pulse time to control the switches. The circuits are so arranged that the pulse time determines the time duration in each cycle that the series switch is closed.

A better understanding of the invention will be afforded by the following detailed description considered in conjunction with the accompanying drawings.

DRAWINGS

In the drawings FIG. 1 is a circuit diagram of a prior art arrangement in which attenuators of different value are employed for selecting different degress of attenuation to provide different integrating rates;

Like reference characters are utilized throughout the drawing to designate like parts.

DETAILED DESCRIPTION

Figure 1:
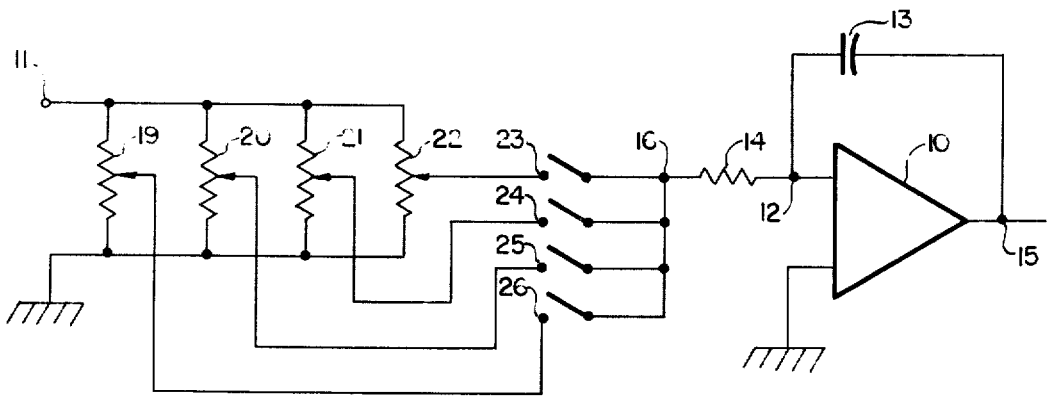

As shown in FIG. 1 representing a circuit of the prior art, an electrical signal applied to an input terminal 11 may be integrated by connecting it to the input terminal 12 of an integrating, operational amplifier consisting of an amplifier 10 which may be an integrated circuit solid-state device having a feedback capacitor 13 and an input resistor 14 with the feedback capacitor 13 connected between the amplifier output terminal 15 and the amplifier input terminal 12 and the input resistor 14 connected between the amplifier input terminal 12 and a terminal 16 connected to the signal input terminal 11.

Integrating rates have been changed by attenuating the input signal and varying the degree of attenuation. In one arrangement there is a plurality of attenuators 19, 20, 21 and 22 each with an output tap at a different attenuation level connected to the integrating operational amplifier input terminal 12 through one of the normally open selector switches 23, 24, 25 and 26, respectively, with suitable means (not shown) for closing whichever one of the selector switches 23–26 provides the needed degree of attenuation to provide the desired integration rate.

Figure 2:
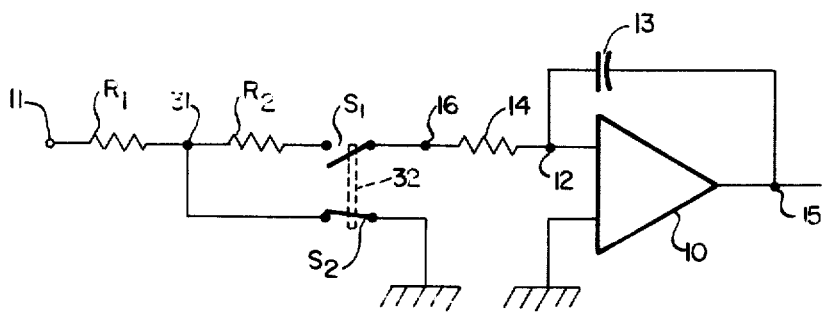
FIG. 2 is a circuit diagram of an embodiment of the invention in which electronic switches are shown schematically in mechanical switch form in the position in which the input signal is grounded.
Figure 3:
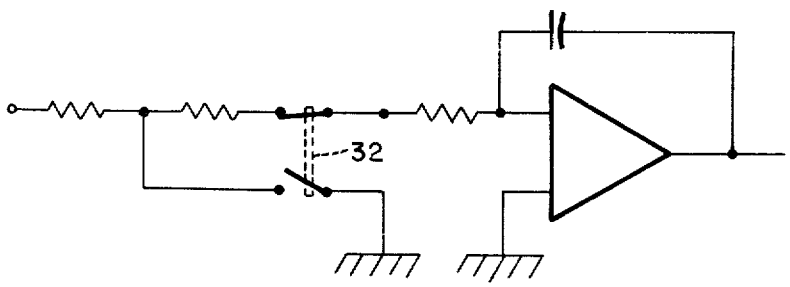
FIG. 3 is a circuit diagram corresponding to FIG. 2 with the switches in the position for connecting the full input signal to the integrator.

Attenuation and varying the degree of attenuation are avoided in the embodiment of the invention illustrated in FIGS. 2 and 3 by providing resistance such as a pair of resistors $R_1$ and $R_2$ in series between the signal input terminal 11 and the operational amplifier input terminal 12 with a switch $S_1$ connected serially between the resistor $R_2$ and the terminal 12. The resistors $R_1$ and $R_2$ may have a junction terminal 31 and a second switch $S_2$ may be connected between the junction terminal 31 and a ground connection for shunting or grounding the input signal at the terminal 11 when the switch $S_2$ is closed as illustrated in FIG. 2.

A suitable interlock is provided for causing the switch $S_1$ to be open when the switch $S_2$ is closed and vice versa. For simplicity in the schematic circuit drawings, a mechanical interlock in the form of a bar 32 has been shown, connecting schematically represented switch blades of switches $S_1$ and $S_2$. In practice, however, the switches $S_1$ and $S_2$ are preferably electronic switches with electrical or electronic interlocking circuitry to cause the full input signal at the terminal 11 to be applied to the operational amplifier 10 when the terminal 11 is connected to the terminal 12 through the series resistors and shunting circuit from the junction terminal 31 is open as in FIG. 3. The opposite condition is illustrated in FIG. 2. Electronic switches represented by the symbols $S_1$ and $S_2$ may take the form of field-effect transistors of conventional type having control terminals or gate connections which are alternately energized at a predetermined pulse rate by a suitable circuit.

The condition of either conductivity or high impedance of the field-effect transistor is determined by the potential applied to the gate of the field-effect transistor.

Figure 4:
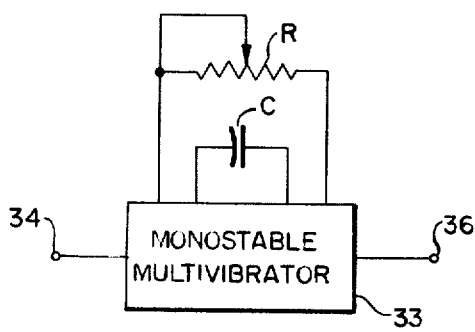
FIG. 4 is a diagram partially in block form of a variable pulse generator for controlling on and off time of the swtiches.

A suitable adjustable pulse duration, fixed-frequency controller for the field-effect transistors may take the form of a monostable multivibrator 33 represented schematically by the rectangle in FIG. 3 or a plurality of selectively connected monostable multivibrators, each with a different pulse duration. Such circuits, as will be recognized by those skilled in the art, include cross-coupling connections including resistors and capacitors, two of which have been brought out for the sake of illustration in FIG. 4, namely a capacitor C and a resistor R, shown as adjustable in resistance. The repetition rate of such monostable multivibrators depends upon the repetition rate of triggering signals applied to the trigger input terminal 34 and the duration of each pulse of the monostable multivibrator depends upon the reltionship between the values of resistance and capacitance in the circuit. As illustrated in FIG. 3, the value of one of these elements is made adjustable, namely the resistance of the resistor R for adjustment of the pulse duration.

Figure 5:
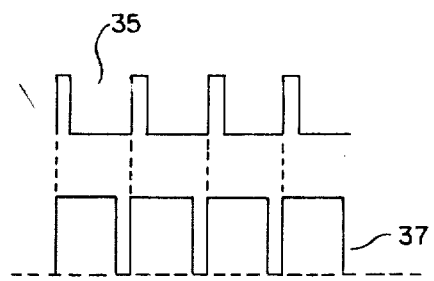
FIG. 5 is a graph illustrating input and output pulses to the pulse generator represented in FIG. 4.

Any suitable control frequency may be employed, such as the frequency of a 60-cycle central power source which may be applied to the trigger input terminal 34, preferably through a square wave pulse former (not shown), providing input triggering pulses 35 as illustrated in FIG. 5. The length of each output pulse of square wave appearing at the output terminal 36 of the monostable multivibrator 33 is shown in the square wave 37 of FIG. 5. Variation in length of each output pulse is accomplished as previously indicated by adjusting the value of the resistance of the resistor R of FIG. 4. The output pulse 37 is applied to the gate of one of the field-effect transistors $S_1$ with one polarity and, if a second switch is used, to the gate of the other field-effect transistor $S_2$ with the opposite polarity so that one switch $S_1$ conducts while the other switch $S_2$ blocks the circuit, or vice versa.

Figure 6:
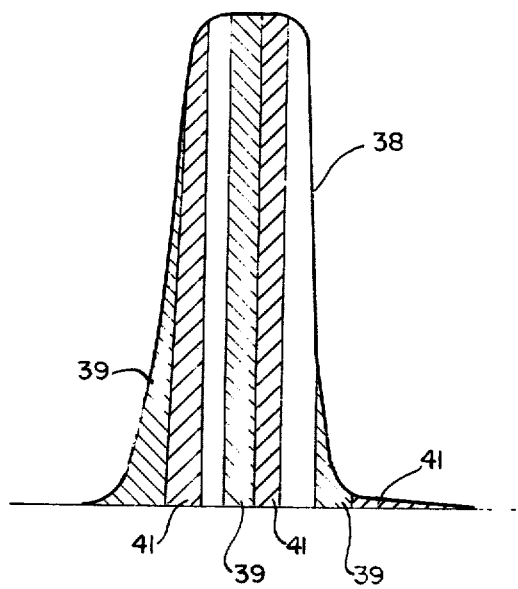
FIG. 6 is a graph illustrating the principle of operation in which detector signal is plotted vertically against time plotted horizontally.

Assuming that one of the peaks or loops of a chromatograph of a gas chromatograph analyzer has the form represented by the curve 38 of FIG. 6, the effect of a variation in integration rate may be accomplished by having the switch $S_1$ under one condition closed during periods of time represented by the shaded areas 39 of FIG. 6 so that the signal 38 will be integrated at a relatively low rate, or under another condition having the switch $S_1$ closed during longer periods of time represented by both shaded areas 39 and 41 in FIG. 6 so that integration will take place at a faster rate. This corresponds to two different pulse lengths of the square wave 37 of FIG. 5 for two different settings of the resistor R of FIG. 4. It will be understood that for the sake of simplicity in the drawing the number of integration areas 39 and 41 taking place during the length of the signal 38 is out of proportion and there would normally be many more such areas owing to the fact that the retention time of a component of the sample in the chromatograph column is relatively long in comparison with the time duration of a cycle of 60 Hz power frequency current sources.

Although an arrangement has been illustrated in which the junction point 31 of resistors $R_1$ and $R_2$ is alternately grounded, the invention is not limited thereto. Satisfactory operation may be obtained from a single series resistor, eliminating the switch $S_2$ and the shunting connection to the point 31, thus relying only upon periodic interruption of the signal connection to the input of the amplifier 10.

Figure 7:
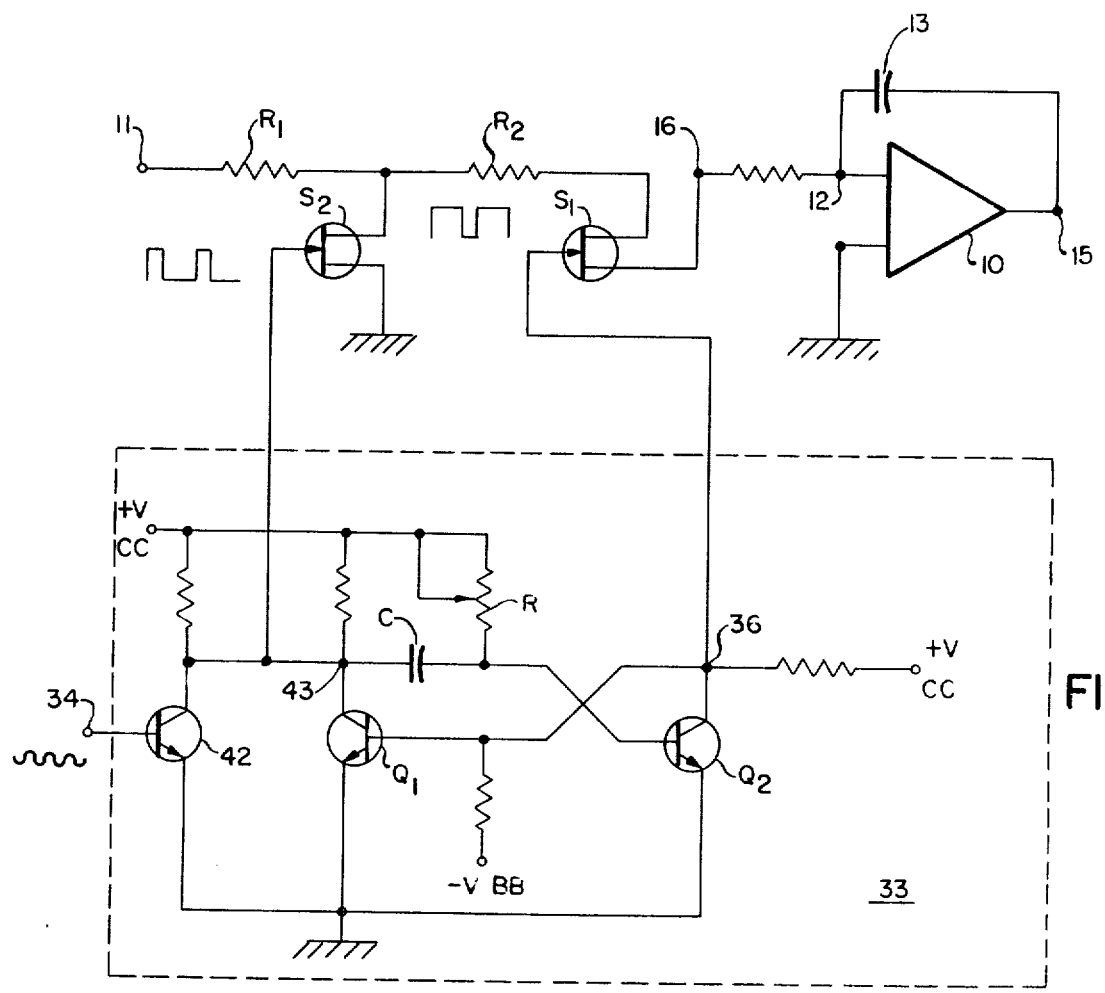
FIG. 7 is a circuit diagram of an illustrative, adjustable integration rate integrator utilizing field-effect transistors as switches.

The invention is not limited to the use of a particular type of circuit for providing the variable pulse length waveform 37 of FIG. 5. However, a suitable circuit is illustrated in FIG. 7 taking the form of a monostable multivibrator utilizing npn transistors including a trigger transistor 42 and cross-coupled transistors $Q_1$ and $Q_2$ wherein the capacitor C provides coupling between the collector of the transistor $Q_1$ and the base of the transistor $Q_2$ and the adjustable resistor R constitutes a discharge circuit for the capacitor C. The positive output terminal 36 at the collector of the transistor $Q_2$ is connected to the gate of the field-effect transistor $S_1$ and the negative output terminal 43 at the collector of the transistor $Q_1$ is connected to the gate of the field-effect transistor switch $S_2$.

Figure 8:
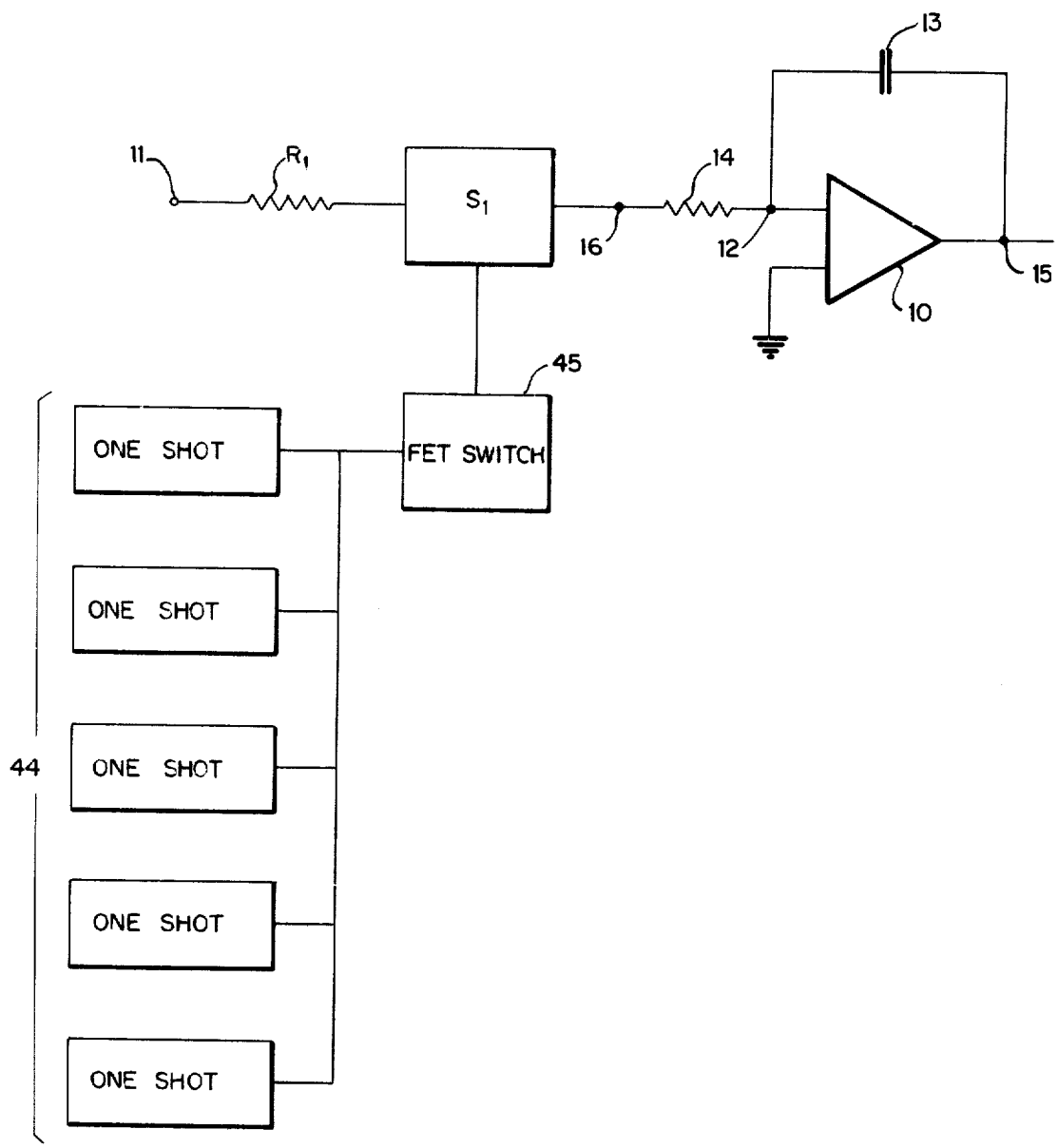
FIG. 8 is a circuit diagram of a modified system.

As illustrated in FIG. 8, a single series switch $S_1$ may be employed with a plurality of different monostable multivibrators or one-shots 44 each having a different pulse length, and coupled through a switch 45 to the gate of the switch $S_1$.

A specific circuit arrangement has been illustrated and described by way of example but it will be understood that the invention is not limited to the embodiment illustrated and various modifications will suggest themselves to those skilled in the art without departing from the spirit of the invention.

What is claimed is:

1. The method of selecting integration rate in integrating an electrical wave of input signal which comprises the steps of:

chopping the wave at a fixed frequency, applying the chopped wave input signal to an integrating circuit, disconnecting the input signal during a portion of each cycle of the wave by interposing a pulse controlled switch, providing pulse generators of the same frequency as the wave applied to the recorder but of different pulse lengths for controlling the interposed switch selecting the pulse generator controlling the interposed switch according to its pulse length in relation to the strength of the input signal, selecting a pulse generator of greater pulse length for a weaker input signal and a pulse generator of shorter pulse length for a stronger input signal and thereby adjusting the relative time duration of such application per chopping cycle that the electrical wave is applied to the integrating circuit to obtain the desired integration rate.

2. An integrating system for an electrical quantity applied to a signal input terminal which comprises:

an electrical integrator having an input terminal, a resistor connected in series between the signal input terminal and integrator input terminal, switch means in the form of field effect transistors including a series connected transistor interposed in the connection of said resistor, the series field effect transistor having gate means which control conducting or blocking condition of the series field effect transistor, and means for intermittently opening and closing said switch means at a predetermined rate comprising variable pulse length control circuit means comprising a plurality of monostable multivibrators each with a different pulse-length and with outputs coupled to the transistor gate means.

* * * * *